US010768001B2

(12) United States Patent
Ghannam et al.

(10) Patent No.: US 10,768,001 B2
(45) Date of Patent: Sep. 8, 2020

(54) METHODS AND APPARATUS TO FACILITATE MITIGATION OF VEHICLE TRAPPING ON RAILROAD CROSSINGS

(71) Applicant: Ford Global Technologies, LLC, Dearborn, MI (US)

(72) Inventors: Mahmoud Yousef Ghannam, Canton, MI (US); Clara Bennie, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 361 days.

(21) Appl. No.: 15/867,348

(22) Filed: Jan. 10, 2018

(65) Prior Publication Data

US 2019/0212156 A1 Jul. 11, 2019

(51) Int. Cl.
*G01C 21/34* (2006.01)
*B60Q 9/00* (2006.01)
(Continued)

(52) U.S. Cl.
CPC ......... *G01C 21/3415* (2013.01); *B60Q 9/008* (2013.01); *B61L 29/24* (2013.01);
(Continued)

(58) Field of Classification Search
CPC ............ G01C 21/3415; G01C 21/3461; G01C 21/3697; B60Q 9/008; B61L 29/24; B61L 15/0018; B61L 27/0011; B61L 2205/04; G01S 19/51; G08G 1/096791; G08G 1/133; B60K 35/00
See application file for complete search history.

(56) References Cited

U.S. PATENT DOCUMENTS 5,554,982 A * 9/1996 Shirkey ................... B61L 3/004
246/122 R
5,825,412 A * 10/1998 Hobson ................... B61L 29/00
348/149
(Continued)

FOREIGN PATENT DOCUMENTS

CA 2887802 A1 * 10/2016 ............. B61L 23/00
JP H01306366 A 12/1989
(Continued)

OTHER PUBLICATIONS

La Trobe University, *Improving Safety at Level Crossings*, 2017, 9 pages.

*Primary Examiner* — Courtney D Heinle
(74) *Attorney, Agent, or Firm* — Frank Lollo; Eversheds Sutherland (US) LLP

(57) ABSTRACT

Method and apparatus are disclosed to facilitate mitigation of vehicle trapping on railroad crossings. An example vehicle comprises a global positioning system (GPS) receiver, sensors, a transceiver, a processor and a memory. The GPS receiver generates location information. The sensors generate vehicle information. The processor and memory are in communication with the sensors, the GPS receiver, and the transceiver. The processor is configured to: determine whether the vehicle is stranded on a railroad crossing using the location information and the vehicle information; if the vehicle is stranded, generate a help request; and transmit the help request to neighboring vehicles.

20 Claims, 14 Drawing Sheets

(51) Int. Cl.
    *B61L 29/24*           (2006.01)
    *G01C 21/36*           (2006.01)
    *G01S 19/51*           (2010.01)
    *G08G 1/0967*         (2006.01)
    *G08G 1/133*           (2006.01)
    *B60K 35/00*           (2006.01)
    *B61L 15/00*           (2006.01)
    *B61L 27/00*           (2006.01)

(52) U.S. Cl.
    CPC ..... *G01C 21/3461* (2013.01); *G01C 21/3697* (2013.01); *G01S 19/51* (2013.01); *G08G 1/096791* (2013.01); *G08G 1/133* (2013.01); *B60K 35/00* (2013.01); *B61L 15/0018* (2013.01); *B61L 27/0011* (2013.01); *B61L 2205/04* (2013.01)

(56) References Cited

U.S. PATENT DOCUMENTS

| | | | | |
|---|---|---|---|---|
| 5,864,304 A * | 1/1999 | Gerszberg | ............... | B61L 29/18 246/122 R |
| 6,179,252 B1 * | 1/2001 | Roop | ............... | B61L 29/18 246/122 R |
| 6,195,020 B1 * | 2/2001 | Brodeur, Sr. | ............... | B61L 29/22 246/125 |
| 6,345,233 B1 * | 2/2002 | Erick | ............... | B61L 25/021 340/901 |
| 6,641,091 B1 * | 11/2003 | Hilleary | ............... | B61L 29/08 246/111 |
| 6,751,549 B1 * | 6/2004 | Kozak | ............... | B61L 29/246 701/410 |
| 7,835,864 B1 * | 11/2010 | Oexmann | ............... | G08G 1/163 701/470 |
| 9,205,816 B2 * | 12/2015 | Kobana | ............... | B60K 28/06 |
| 9,841,286 B1 * | 12/2017 | Hayward | ............... | G05D 1/0214 |
| 2003/0058131 A1 * | 3/2003 | Grisham | ............... | B61L 29/246 340/907 |
| 2005/0275513 A1 * | 12/2005 | Grisham | ............... | B60Q 9/008 340/435 |
| 2006/0015224 A1 * | 1/2006 | Hilleary | ............... | B61L 3/125 701/19 |
| 2006/0186276 A1 * | 8/2006 | Tsai | ............... | B61L 29/06 246/473.1 |
| 2008/0169939 A1 * | 7/2008 | Dickens | ............... | B61L 29/226 340/910 |
| 2009/0184214 A1 * | 7/2009 | Reibeling | ............... | B61L 29/32 246/125 |
| 2011/0084176 A1 * | 4/2011 | Reichelt | ............... | B61L 23/041 246/473.1 |
| 2011/0125405 A1 * | 5/2011 | Blesener | ............... | B61L 29/28 701/301 |
| 2012/0191313 A1 * | 7/2012 | Miyahara | ............... | B60K 28/14 701/70 |
| 2012/0248261 A1 * | 10/2012 | Nichter | ............... | B61L 15/0027 246/125 |
| 2012/0286103 A1 * | 11/2012 | Hilleary | ............... | B61L 23/041 246/125 |
| 2013/0018534 A1 * | 1/2013 | Hilleary | ............... | B61L 29/30 701/19 |
| 2013/0200223 A1 * | 8/2013 | Alexander | ............... | B61L 29/28 246/473.1 |
| 2013/0289805 A1 * | 10/2013 | Makkinejad | ............ | B61L 29/32 701/19 |
| 2014/0005905 A1 * | 1/2014 | Kanner | ............... | B61L 29/243 701/70 |
| 2014/0166820 A1 * | 6/2014 | Hilleary | ............... | B61L 29/246 246/125 |
| 2014/0203149 A1 * | 7/2014 | Raiser | ............... | B61L 29/246 246/473.1 |
| 2014/0263857 A1 * | 9/2014 | Huntimer | ............... | B61L 25/025 246/122 R |
| 2014/0346284 A1 * | 11/2014 | Fries | ............... | B61L 13/00 246/125 |
| 2014/0361126 A1 * | 12/2014 | Steffen | ............... | B61L 29/22 246/473.1 |
| 2014/0367526 A1 * | 12/2014 | Steffen, II | ............... | B61L 23/00 246/126 |
| 2015/0294566 A1 * | 10/2015 | Huang | ............... | G08G 1/133 701/41 |
| 2016/0200334 A1 * | 7/2016 | Hilleary | ............... | G08G 1/097 246/218 |
| 2017/0032585 A1 * | 2/2017 | Stenneth | ............... | G07C 5/008 |
| 2017/0217463 A1 * | 8/2017 | DeJarnatt | ............ | B61L 15/0027 |
| 2017/0267265 A1 * | 9/2017 | Bartolotti | ............... | B61L 29/00 |
| 2017/0291620 A1 * | 10/2017 | Plant | ............... | B61L 1/185 |
| 2018/0018888 A1 * | 1/2018 | Townsend | ............... | B60Q 9/008 |
| 2018/0186392 A1 * | 7/2018 | Da Costa | ............... | G08G 7/02 |
| 2019/0145791 A1 * | 5/2019 | Rempel | ............ | G08G 1/096833 701/410 |
| 2019/0279506 A1 * | 9/2019 | Kelgernon | ............... | G08G 1/16 |
| 2019/0316920 A1 * | 10/2019 | Miyagawa | ............ | G01C 21/26 |

FOREIGN PATENT DOCUMENTS

| | | |
|---|---|---|
| JP | 2001223821 A | 8/2001 |
| JP | 4069793 B2 | 4/2008 |

* cited by examiner

US 10,768,001 B2

METHODS AND APPARATUS TO FACILITATE MITIGATION OF VEHICLE TRAPPING ON RAILROAD CROSSINGS

TECHNICAL FIELD

The present disclosure generally relates to vehicle navigation and communication features and, more specifically, methods and apparatus to facilitate mitigation of vehicle trapping on railroad crossings.

BACKGROUND

In recent years, vehicles have been equipped with high-performance vehicle navigation features such as global positioning systems (GPS) and communication features such as in-vehicle telephone systems, dedicated short range communications (DSRC), etc. Navigation features often aid drivers to find and follow a route. Communication features allow drivers to communicate with other parties outside a vehicle and/or with other vehicles. Navigation and communication vehicle features are often engaged by a driver via an interface of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises a global positioning system (GPS) receiver, sensors, a transceiver, a processor, and a memory. The GPS receiver generates location information. The sensors generate vehicle information. The processor and memory are in communication with the sensors, the GPS receiver, and the transceiver. The processor is configured to: determine whether the vehicle is stranded on a railroad crossing using the location information and the vehicle information; if the vehicle is stranded, generate a help request; and transmit the help request to neighboring vehicles.

An example method is disclosed. The method comprises: determining, with a processor, whether a vehicle is stranded on a railroad crossing using location information provided by a global positioning system (GPS) receiver and vehicle information generated by sensors; if the vehicle is stranded, generating, with the processor, a help request; and transmitting, with the processor, the help request to neighboring vehicles via a transceiver.

An example system is disclosed. The system comprises a central facility, a dedicated short range communication (DSRC) transceiver, sensors, a global positioning system (GPS) receiver, and a processor. The central facility has a train schedule database. The DSRC transceiver is disposed in a vehicle and in communication with the with one or more of the database, neighboring vehicles, a police vehicle, and a train. The sensors are disposed in the vehicle and generate vehicle information. The GPS receiver is disposed in the vehicle and generates location information of the vehicle. The processor is in communication with the DSRC transceiver, the sensors, and the GPS receiver. The processor is configured to: determine whether the vehicle is stranded on an at-grade railroad crossing along a path of the train using the location information and the vehicle information; if the vehicle is stranded, generate a help request; and transmit the help request to neighboring vehicles.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
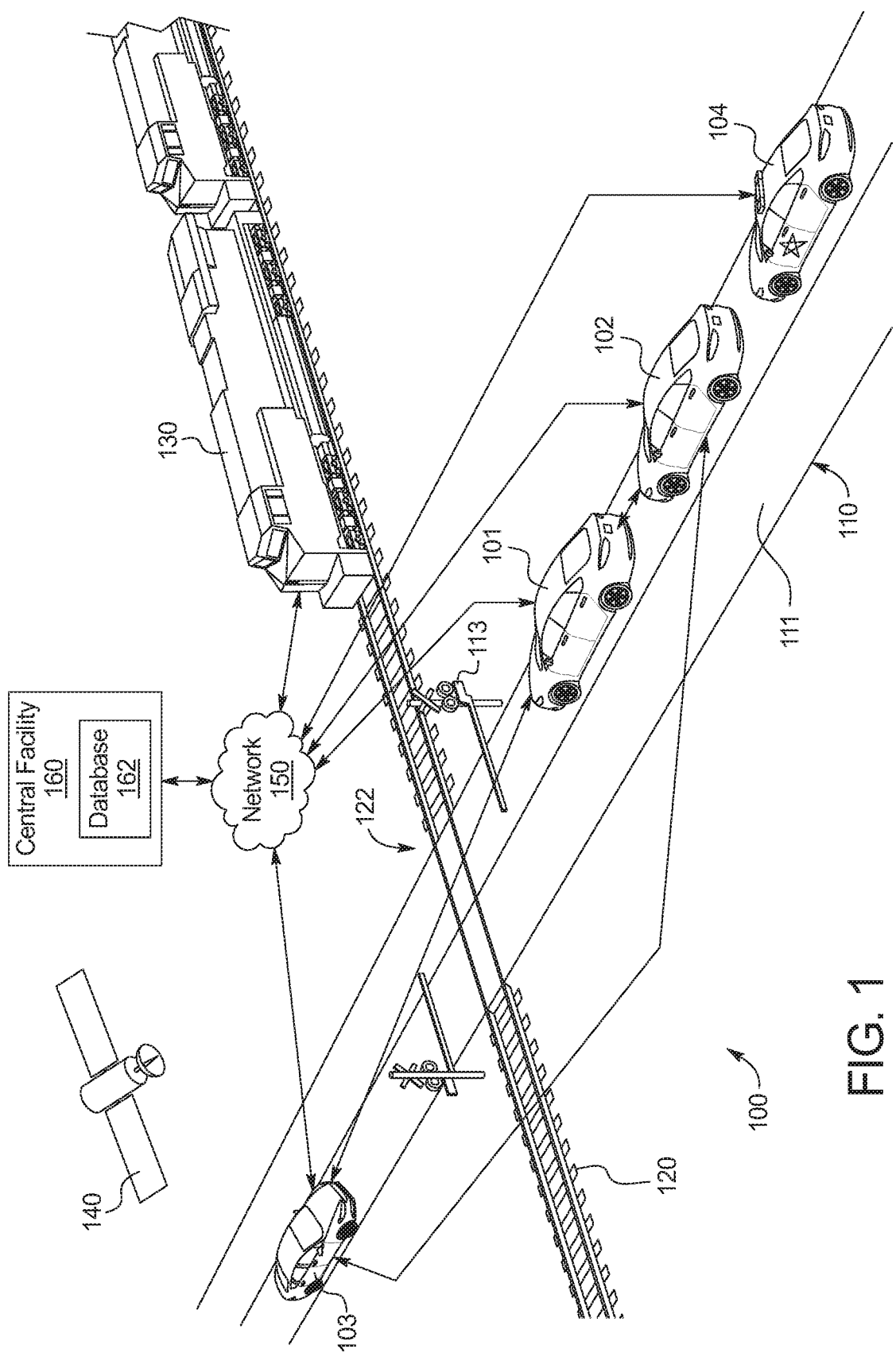
FIG. 1 illustrates a vehicle operating in accordance with the teachings of this disclosure in an environment.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Railroads intersect vehicle roadways at railroad crossings. Some railroad crossings allow vehicles to pass over or under railroad tracks to prevent disruption of rail and vehicle traffic and to prevent collisions between trains and vehicles. However, some railroad crossings are at-grade, where vehicle and rail traffic are at substantially the same height Traditionally, at-grade railroad crossings are equipped with warning lights, bells, signs, gates, etc. to alert drivers of vehicles of oncoming trains. Despite the railroad crossing warning equipment, vehicles occasionally become stuck on at-grade railroad crossings and are struck by trains.

This disclosure provides methods and apparatus to provide warnings related to at-grade railroad crossings along a vehicle's route, request help from other vehicles, and/or to report collisions between trains and vehicles. By providing railroad crossing warnings, a driver may choose an alternate route and/or be vigilant of the railroad crossing. By requesting help from other vehicles, a nearby vehicle may push a stranded vehicle from a railroad crossing before a train arrives. By reporting collisions between trains and vehicles, emergency vehicles may arrive more quickly to a collision location.

Figure 2:
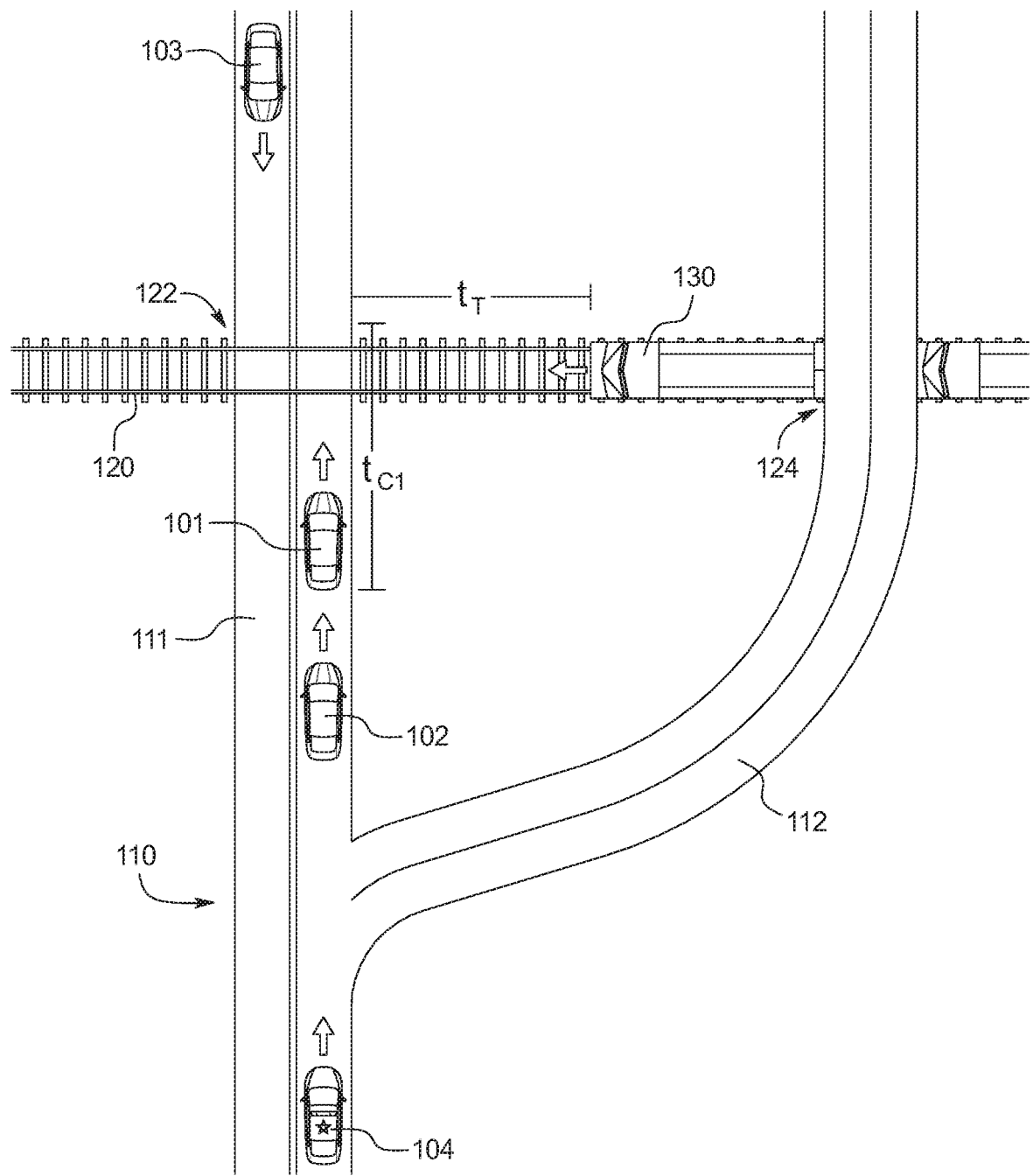
FIG. 2 illustrates the vehicle in the environment of FIG. 1 at a first time.
Figure 3:
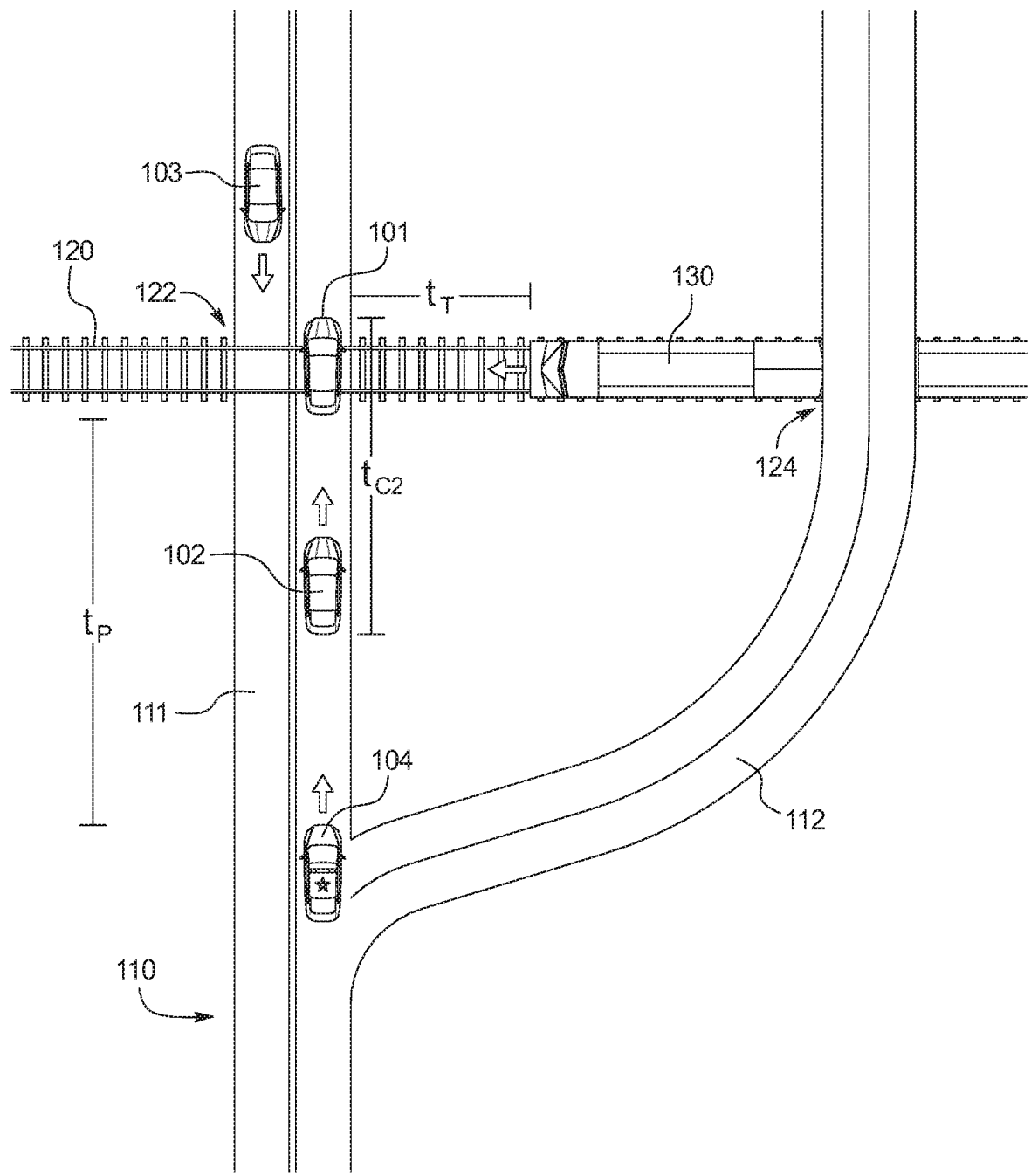
FIG. 3 illustrates the vehicle in the environment of FIG. 1 at a second time.
Figure 4:
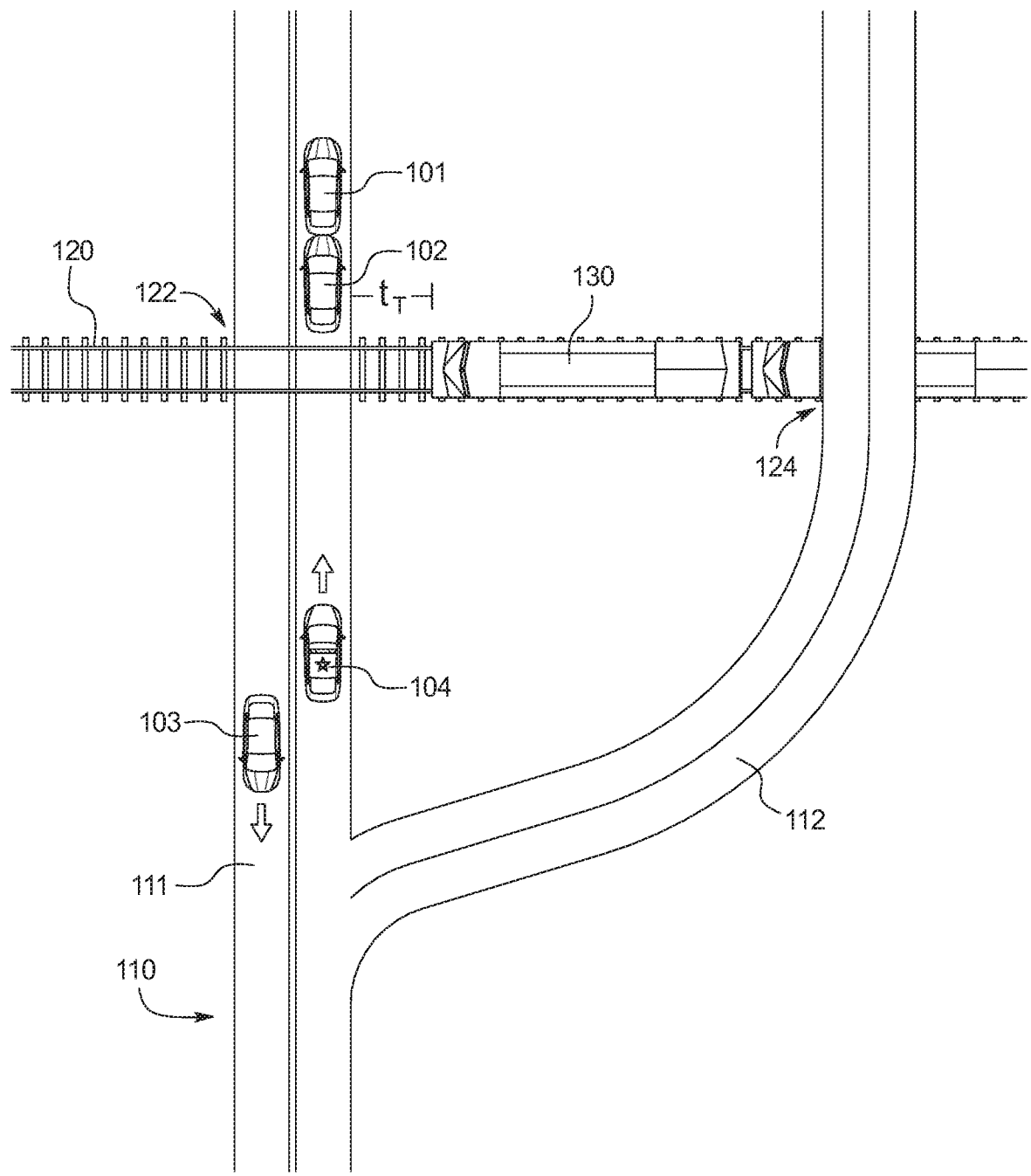
FIG. 4 illustrates the vehicle in the environment of FIG. 1 at a third time.
Figure 5:
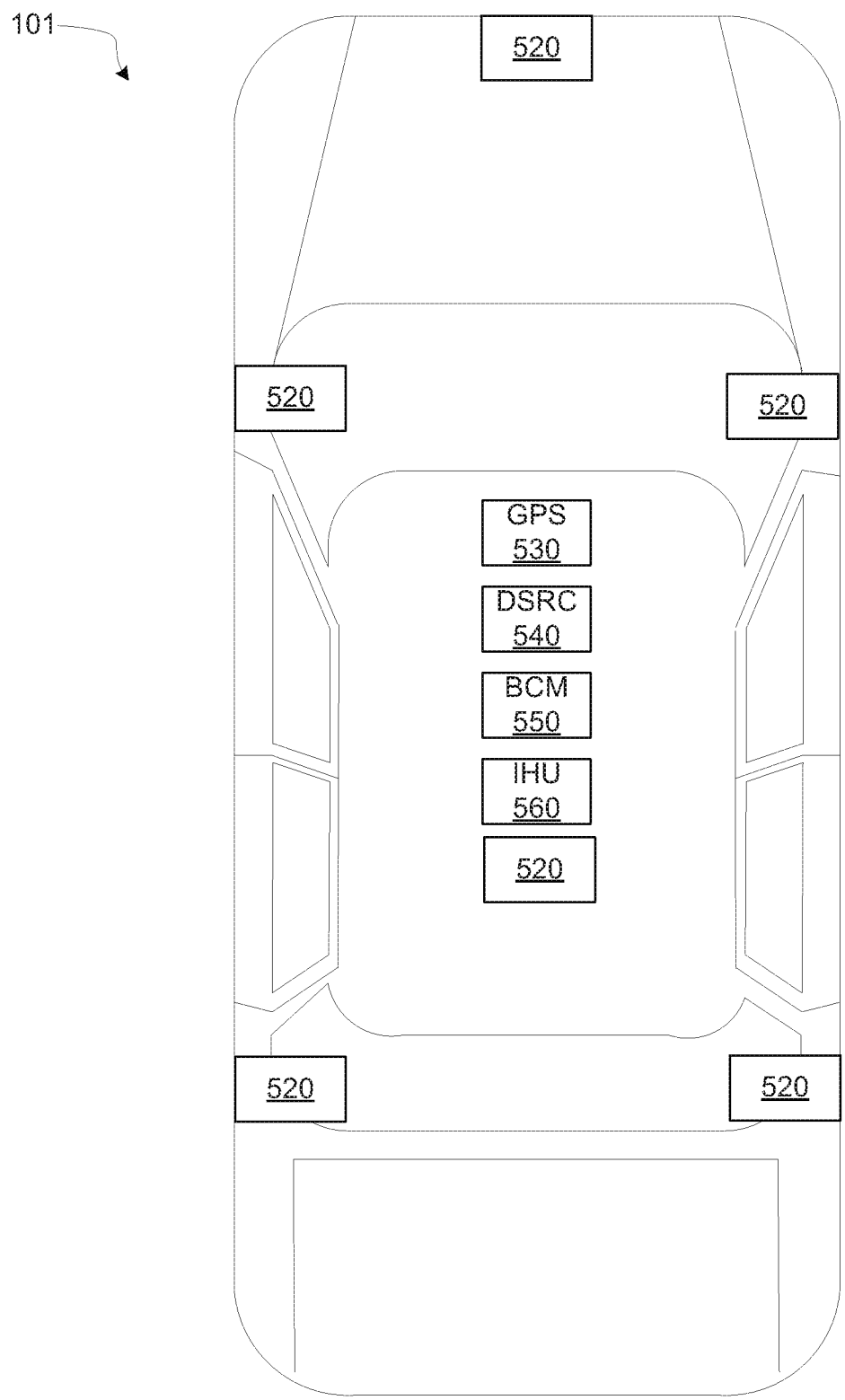
FIG. 5 is a schematic view of the vehicle of FIG. 1.

FIG. 1 illustrates a vehicle 101 operating in accordance with the teachings of this disclosure in an environment 100. FIG. 2 illustrates the vehicle 101 in the environment 100 at a first time. FIG. 3 illustrates the vehicle 101 in the environment 100 a second time. FIG. 4 illustrates the vehicle 101 in the environment 100 at a third time. FIG. 5 is a schematic view of the vehicle 101 of FIG. 1.

As shown in FIGS. 1-4, the vehicle 101 is a first vehicle 101. Additionally, as illustrated in FIGS. 1-4, the environment 100 includes a second vehicle 102, a third vehicle 103, a police vehicle 104, a roadway 110, a railroad 120, a train 130, a GPS satellite 140, a network 150, and a central facility 160. The roadway 110 includes a selected route 111, an alternate route 112, and a railroad warning equipment 113. The railroad 120 includes an at-grade crossing 122 and an overpass crossing 124. The selected route 111 crosses the railroad 120 at the at-grade crossing 122. The alternate route 112 crosses the railroad 120 via the overpass crossing 124. The 160 central facility includes a database 162 of train schedule information.

In the example of FIG. 2, the train 130 will arrive at the at-grade crossing 122 at a train arrival time $t_T$ and the first vehicle 101 will arrive at the at-grade crossing at a first crossing time $t_{C1}$. Further, as shown in FIGS. 1-4 the first and third vehicles 101, 103 travel in opposite directions to approach one another along the roadway 110.

In the example of FIG. 3, the first vehicle 101 is stranded at the at-grade crossing 122, the train 130 approaches the at-grade crossing 122 to arrive at the train arrival time $t_T$, the second vehicle 102 will arrive at the at-grade crossing 122 at a second crossing time $t_{C2}$, and the police vehicle 104 will arrive at the at-grade crossing 122 at a police arrival time $t_P$.

In the example of FIG. 4, the second vehicle 102 has pushed the first vehicle 101 off the at-grade crossing 122 before the train 130 arrives at the train arrival time $t_T$.

The vehicle 101 may be a standard gasoline powered vehicle, a hybrid vehicle, an electric vehicle, a fuel cell vehicle, and/or any other mobility implement type of vehicle. The vehicle 101 includes parts related to mobility, such as a powertrain with an engine, a transmission, a suspension, a driveshaft, and/or wheels, etc. The vehicle 101 may be non-autonomous, semi-autonomous (e.g., some routine motive functions controlled by the vehicle 101), or autonomous (e.g., motive functions are controlled by the vehicle 101 without direct driver input). As shown in FIG. 5 the first vehicle 101 includes sensors 520, a GPS receiver 530, a dedicated short range communication (DSRC) transceiver 540, a body control module (BCM) 550, and an infotainment head unit (IHU) 560. It should be understood that the second, third, and police vehicles 102, 103, 104 may each also respectively have sensors, a GPS receiver, a DSRC transceiver, a BCM, and an IHU.

The first vehicle 101 is in communication with the GPS satellite 140 via the GPS receiver 530. The first vehicle 101 is in communication with the central facility 160 via the DSRC transceiver 540 and the network 150. If the second and third vehicles 102, 103 are equipped with respective DSRC transceivers, the first vehicle 101 is in communication with the second and third vehicles 102, 103 via the DSRC transceiver 540 directly and/or indirectly via the DSRC transceiver 540 and the network 150. If the police vehicle 104 is equipped with a DSRC transceiver, the first vehicle 101 is in communication with the police vehicle 104 via the DSRC transceiver 540 and the network 150.

The sensors 520 may be arranged in and around the vehicle 101 in any suitable fashion. The sensors 520 may be mounted to measure properties around the exterior of the vehicle 101. Additionally, some sensors 520 may be mounted inside the cabin of the vehicle 101 or in the body of the vehicle 101 (such as, the engine compartment, the wheel wells, etc.) to measure properties in the interior of the vehicle 101. For example, such sensors 520 may include accelerometers, odometers, tachometers, pitch and yaw sensors, wheel speed sensors, microphones, tire pressure sensors, and biometric sensors, etc. In the illustrated example, the sensors 520 are a camera, radar, lidar, an inertial measurement unit (IMU), tire pressure sensors, wheel speed sensors, and vehicle systems monitoring sensors (sometimes referred to as vehicle health sensors). The sensors 520 sense the railroad crossings 122, 124, the railroad warning equipment 113, and other vehicles (e.g., the second and third vehicles 102, 103). The sensors 520 sense the operating condition of the vehicle 101. In other words, the sensors 520 generate traffic information and vehicle information for the vehicle 101.

The example DSRC transceiver 540 includes antenna(s), radio(s) and software to broadcast messages and to establish connections between the vehicles 101, 102, 103, infrastructure-based modules (e.g., the central facility 160), and mobile device-based modules. More information on the DSRC network and how the network may communicate with vehicle hardware and software is available in the U.S. Department of Transportation's Core June 2011 System Requirements Specification (SyRS) report (available at http://www its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as GPS, Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The body control module 550 controls various subsystems of the vehicle 101. For example, the body control module 550 may control power windows, power locks, an immobilizer system, and/or power mirrors, etc. The body control module 550 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc.

In the example of FIG. 2, the BCM 550 determines whether to warn a driver of the first vehicle 101 of an at-grade railroad crossing along the selected route 111 based on traffic information provided by the sensors 520, train arrival times provided by the central facility 160 via the DSRC transceiver 540, and location information provided via the GPS receiver 530.

In the example of FIG. 3, the BCM 550 determines whether to send a help request to a nearby vehicle (e.g., the second vehicle 102), the train 130, and/or the police vehicle 104 via the DSRC transceiver 540 based on location information provided via the GPS receiver 530.

In the example of FIG. 4, the BCM 550 determines whether to display a help request message to a driver (e.g., of the second vehicle 102) to aid a stranded vehicle (e.g., the first vehicle 101) based on train arrival times $t_T$ provided by the central facility 160 via the DSRC transceiver 540 and location information provided via the GPS receiver 530.

In the example of FIG. 3, the BCM 550 (e.g., of the third vehicle 103) determines whether to alert the police vehicle 104 and/or the train 130 of a potential collision at the at-grade crossing 122 based on traffic information provided by the sensors 520, help requests received via the DSRC transceiver 540, and location information provided via the GPS receiver 530.

The infotainment head unit 560 provides an interface between the vehicle 101 and a user. The infotainment head unit 560 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 560 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 560 displays the infotainment system on, for example, the center console display. A driver of the vehicle 101 may enter the selected route 111 into BCM 550 via the IHU 560.

Figure 6:
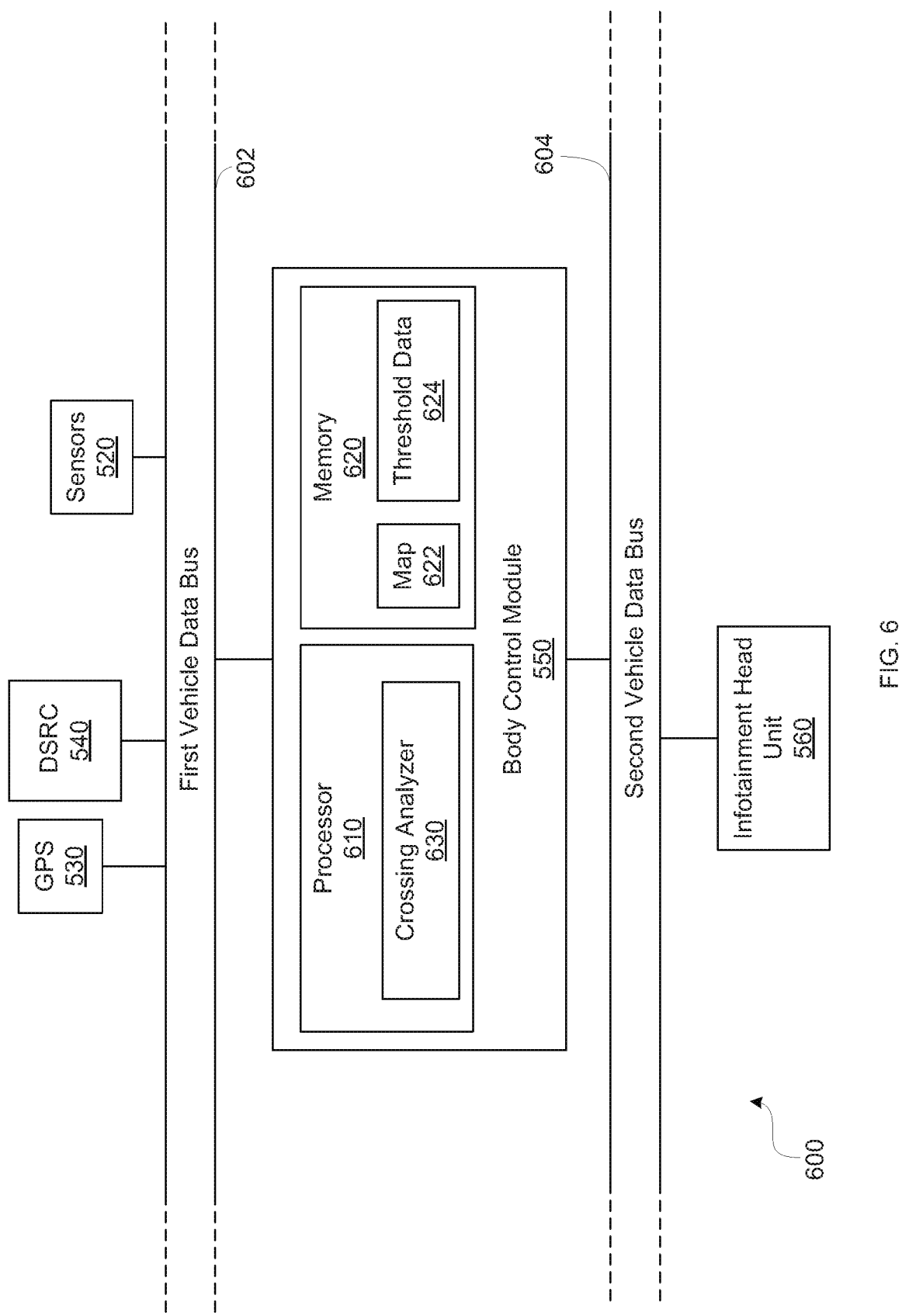
FIG. 6 is a block diagram of the electronic components of the vehicle of FIG. 1.

FIG. 6 is a block diagram of the electronic components 600 of the vehicle 101 of FIG. 1. The first vehicle data bus 602 communicatively couples the sensors 520, the GPS receiver 530, the DSRC transceiver 540, the BCM 550, and other devices connected to the first vehicle data bus 602. In some examples, the first vehicle data bus 602 is implemented in accordance with the controller area network (CAN) bus protocol as defined by International Standards Organization (ISO) 11898-1. Alternatively, in some examples, the first vehicle data bus 602 may be a Media Oriented Systems Transport (MOST) bus, or a CAN flexible data (CAN-FD) bus (ISO 11898-7). The second vehicle data bus 604 communicatively couples the BCM 550 and the infotainment head unit 560. The second vehicle data bus 604 may be a MOST bus, a CAN-FD bus, or an Ethernet bus. In some examples, the BCM 550 communicatively isolates the first vehicle data bus 602 and the second vehicle data bus 604 (e.g., via firewalls, message brokers, etc.). Alternatively, in some examples, the first vehicle data bus 602 and the second vehicle data bus 604 are the same data bus.

The BCM 550 includes a processor or controller 610 and memory 620. In the illustrated example, the BCM 550 is structured to include a crossing analyzer 630. Alternatively, in some examples, the crossing analyzer 630 may be incorporated into another electronic control unit (ECU) with its own processor 610 and memory 620. In operation, the crossing analyzer 630 determines whether to generate railroad crossing warning messages, send help requests, to generate help request messages for display on the IHU 560, and/or to send collision warnings based on traffic information from the sensors 520, location information from the GPS receiver 530, train arrival times $t_T$ from the central facility 160, and neighboring vehicle information from the DSRC transceiver 540. The processor or controller 610 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 620 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 620 includes multiple kinds of memory, particularly volatile memory and non-volatile memory.

The memory 620 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 620, the computer readable medium, and/or within the processor 610 during execution of the instructions. The memory 620 stores a map 622 and threshold data 624. The map 622 includes location information of railroad crossings (e.g., the at-grade crossing 122 and the overpass crossing 124.). The threshold data 624 includes a predetermined crossing time safety margin (e.g., 30 seconds), a predetermined rescue time safety margin (e.g., 2 minutes), a predetermined safe vehicle exit threshold time (e.g., 2 minutes, 90 seconds, etc.), and a low vehicle speed threshold (e.g., 3 miles per hour).

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 7:
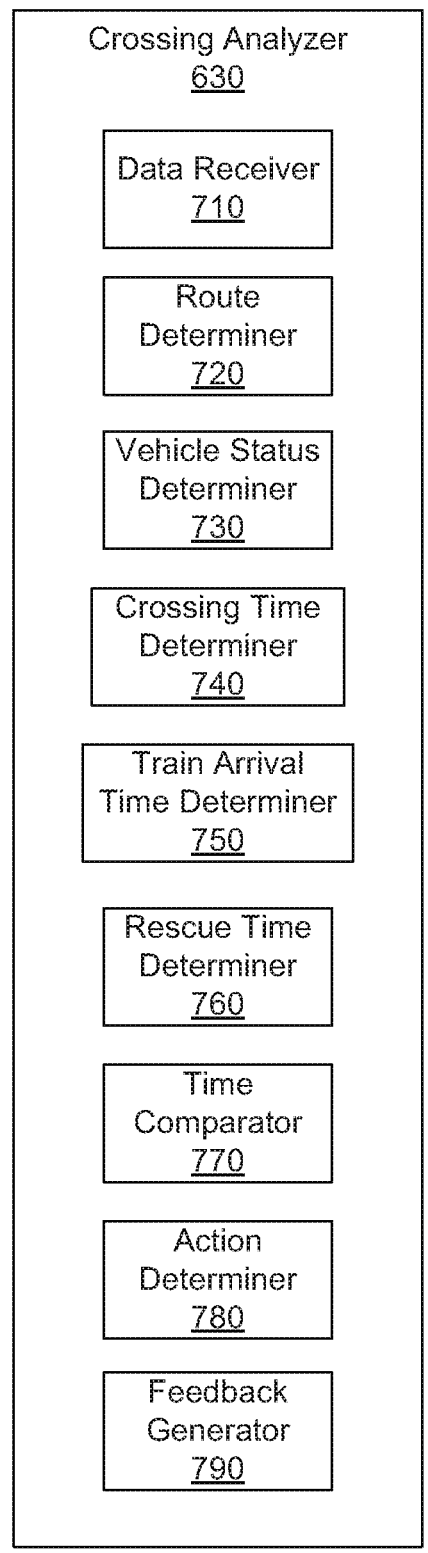
FIG. 7 is a more detailed block diagram of the crossing analyzer of FIG. 6.
Figure 8:
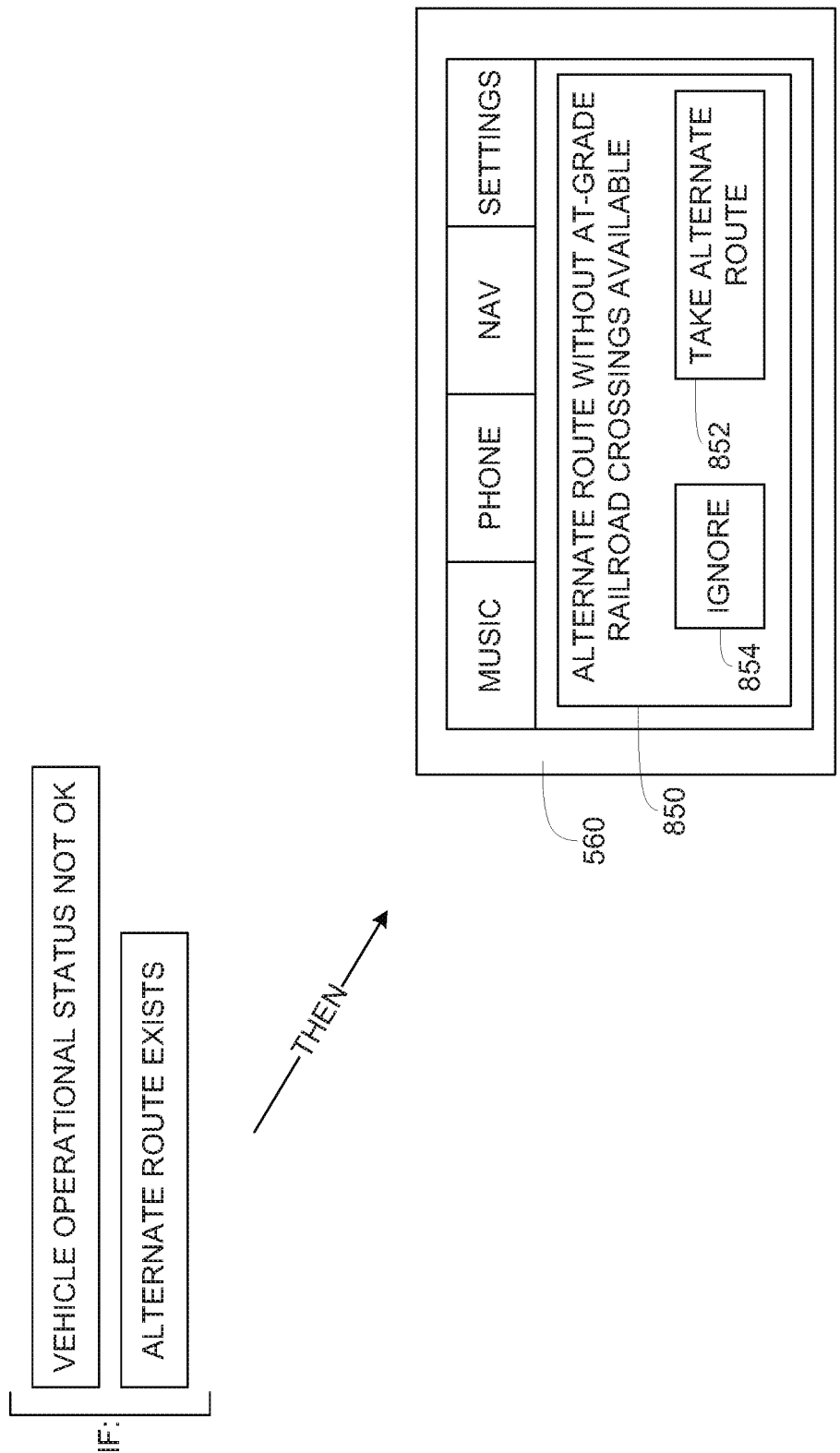
FIG. 8 is a schematic view of logic implemented and a message generated by the electronic components of FIG. 6.

FIG. 7 is a more detailed block diagram of the crossing analyzer 630 of FIG. 6. The crossing analyzer 630 includes a data receiver 710, a route determiner 720, a vehicle status determiner 730, a crossing time determiner 740, a train arrival time determiner 750, a rescue time determiner 760, a time comparator 770, an action determiner 780, and a feedback generator 790.

In operation, the data receiver 710 receives traffic information and vehicle information sent by the sensors 520, location information sent by the GPS receiver 530, help requests from neighboring vehicles from the DSRC transceiver 540, and train schedule information from the central facility 160. The data receiver 710 further receives navigation route information entered by a driver of the vehicle 101 via the IHU 560. The data receiver 710 further receives help request acknowledgement selections sent by the IHU 560.

In operation, the route determiner 720 determines whether a driver of the vehicle 101 has entered a desired navigation route via the IHU 560. If the driver has entered a navigation route, the route determiner 720 accesses the map 622 to determine whether the entered route includes at-grade crossings (e.g., the at-grade crossing 122). If the driver has not entered a route, the route determiner 720 defines a habitual route of the vehicle 101. More specifically, the route determiner 720 analyzes accumulated historical location information provided by the GPS receiver 530 to monitor driving behavior. In other words, the route determiner 720 keeps track of where and when a vehicle travels to find a usual route (e.g., a commuting route between home and work). Further, the route determiner 720 analyzes traffic information provided by the sensors 520 to locate the railroad warning equipment (e.g., the railroad warning equipment 113) indicative of at-grade railroad crossings and stores the locations of the railroad warning equipment in the memory 620. The route determiner 720 accesses the map 622 and the stored railroad warning equipment locations to determine whether the habitual route includes at-grade railroad crossings. Additionally, if the habitual and/or entered route includes at-grade railroad crossings, the route determiner 720 accesses the map 622 to determine whether an alternate route without at-grade railroad crossings exists.

In operation, the vehicle status determiner 730 determines a vehicle operational status. More specifically, the vehicle status determiner 730 determines whether subsystems of the vehicle 101 (e.g., powertrain, tire pressure monitoring, etc.) indicate a warning message based on vehicle information provided by the sensors 520 (e.g., low tire pressure, electrical faults, poor engine performance, etc.). In other words, vehicle status determiner 730 determines whether the vehicle 101 is in good working order. If the vehicle status determiner 730 determines that the vehicle 101 is not in good working order, the vehicle status determiner 730 sends the negative vehicle status to the feedback generator 790.

Figure 9:
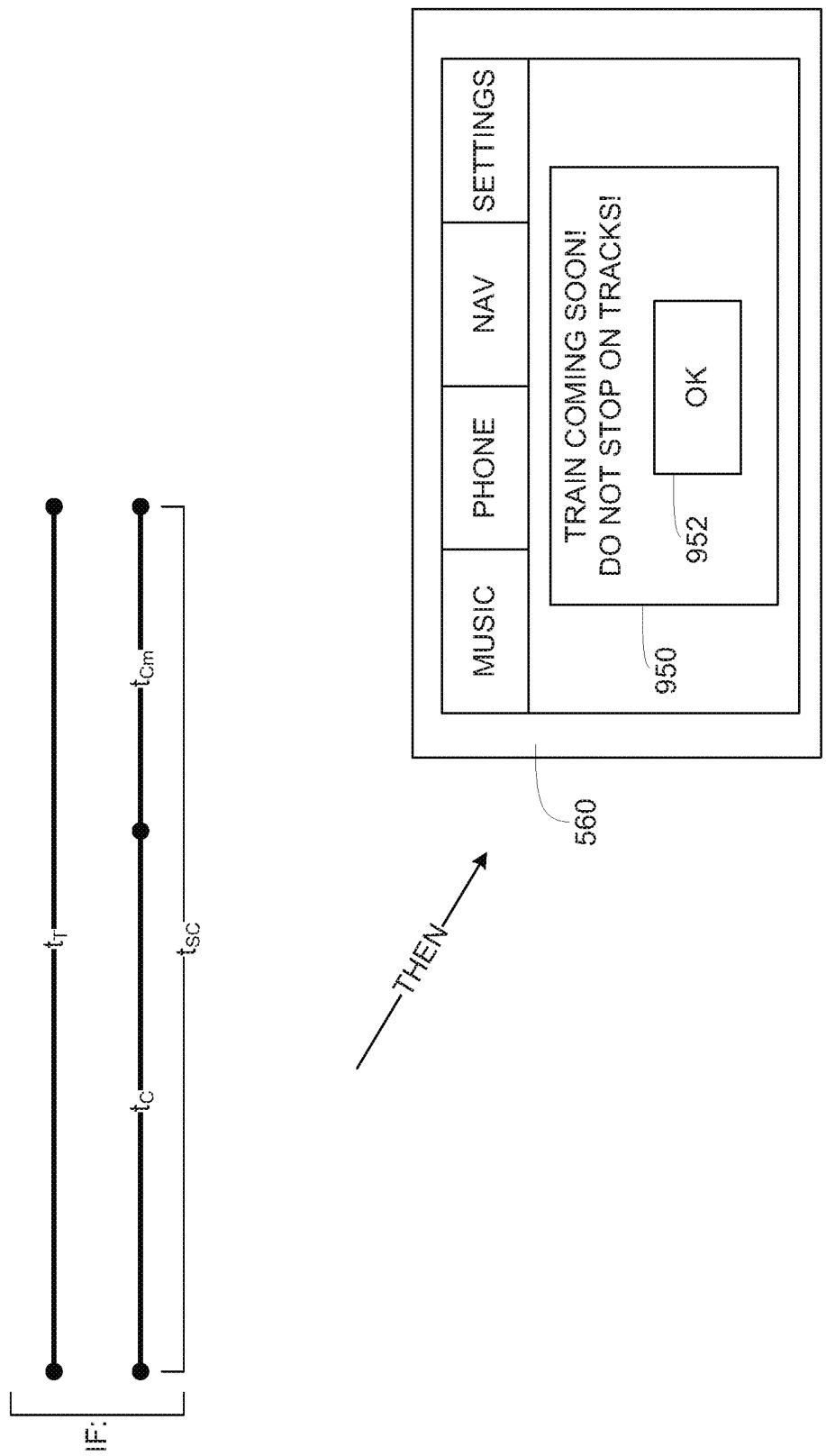
FIG. 9 is a schematic view of logic implemented and another message generated by the electronic components of FIG. 6.

In operation, the crossing time determiner 740 determines a safe crossing time $t_{SC}$, shown in FIG. 9. The safe crossing time $t_{SC}$ includes a base crossing time $t_C$ until the vehicle 101 crosses an at-grade crossing (e.g. the at-grade crossing 122) and the crossing time safety margin $t_{Cm}$. More specifically, the crossing time determiner 740 determines a distance between a current location of the vehicle 101 and the upcoming at-grade crossing based on location information from the GPS receiver 530. The crossing time determiner 740 then calculates the time period until the vehicle 101 crosses the at-grade crossing $t_C$ based in the distance and the speed of the vehicle 101. The crossing time determiner 740 then adds the crossing time safety margin $t_{Cm}$ to the base crossing time $t_C$. In other words, the crossing time determiner 740 determines how much time remains for the vehicle 101 to safely clear the at-grade crossing.

In operation, the train arrival time determiner 750, determines a train arrival time $t_T$, shown in FIGS. 9-12, until a train (e.g., the train 130) crosses the at-grade crossing. More specifically, the train arrival time determiner 750 determines a location of the at-grade crossing 122 using the location information provided by the GPS transceiver 530 and the map 622. Further, the train arrival time determiner 750 analyzes the train schedule information from the database 162 of the central facility 160. The train arrival time determiner 750 determines how much time remains before the train will next arrive at the at-grade crossing 122. In other words, the train arrival time determiner 750 determines a remaining time window $t_T$ to cross the at-grade crossing 122.

Figure 11:
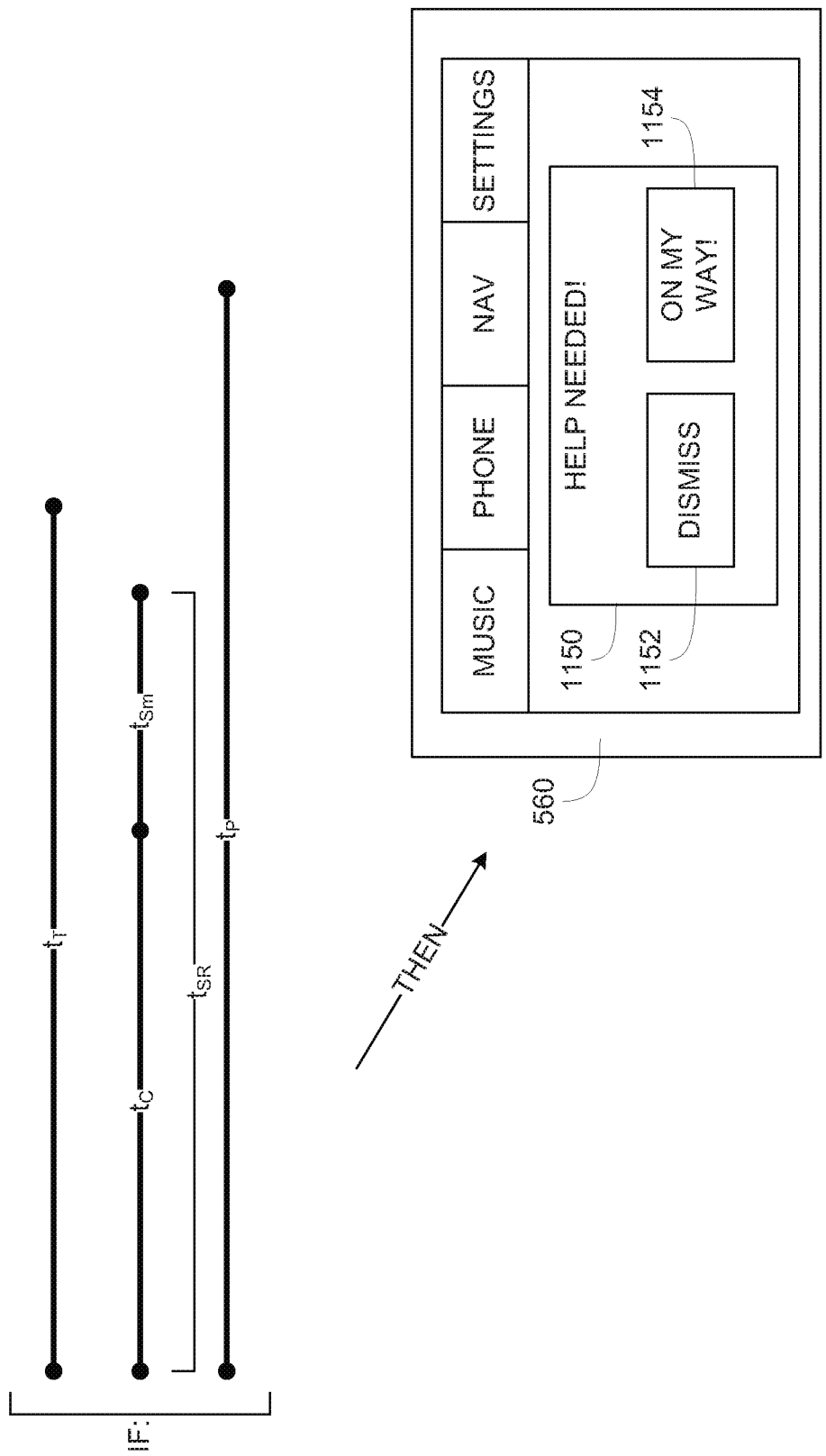
FIG. 11 is a schematic view of logic implemented and another message generated by the electronic components of FIG. 6.

In operation, the rescue time determiner 760, determines a safe rescue time $t_{SR}$, shown in FIG. 11. The safe rescue time $t_{SR}$ includes the base crossing time $t_C$ and the rescue time safety margin $t_{Rm}$, discussed above. More specifically, the rescue time determiner 760 determines a distance between a current location of the vehicle 101 and the upcoming at-grade crossing based on location information from the GPS receiver 530. The rescue time determiner 760 then calculates the time period until the vehicle 101 crosses the at-grade crossing $t_C$ based in the distance and the speed of the vehicle 101. The rescue time determiner 760 then adds the rescue time safety margin $t_{Rm}$ to the base crossing time $t_C$. In other words, the rescue time determiner 760 determines how much time remains for the vehicle 101 to safely push a stranded vehicle out of the at-grade crossing and to also clear the at-grade crossing. It should be appreciated that the rescue time determiner 760 is implemented in response to a help request from another vehicle.

In operation, the time comparator 770, determines whether the vehicle 101 can safely cross the at-grade crossing, or, in response to a help request, rescue a stranded vehicle. More specifically, the time comparator 770 determines whether the safe crossing time $t_{SC}$ is greater than or equal to the train arrival time $t_T$, as shown in FIG. 9. In other words, the time comparator 770 determines whether the vehicle 101 will safely clear the at-grade crossing before the train arrives. In response to a help request, the time comparator 770 determines whether the safe rescue time $t_{SR}$ is greater than or equal to the train arrival time $t_T$ and to a police arrival time $t_P$, as shown in FIG. 11. In other words, the time comparator 770 determines whether the vehicle 101 can safely rescue a stranded vehicle stuck on the at-grade crossing before the train and the police vehicle 104 arrive.

In operation, the action determiner 780 determines whether messages regarding the at-grade crossing are to be displayed on the IHU 560.

More specifically, the action determiner 780 determines whether to display an alternate route message 850 via the IHU 560 based on the vehicle operational status from the vehicle status determiner 730 and alternate route availability from the route determiner 720. The alternate route message 850 includes an acceptance button 852 and a dismiss button 854. If the vehicle operational status provided by the vehicle status determiner 730 indicates that the vehicle 101 is not in good working order (e.g., has low tire pressure, has electrical faults, has poor powertrain performance, etc.) and an alternate route without at-grade railroad crossings (e.g., the alternate route 112 via the overpass crossing 124) exists, the action determiner 780 determines that the alternate route message 850 is to be displayed via the IHU 560. For example, the alternate route message 850 may suggest that the driver of the vehicle 101 take the alternate route determined by the route determiner 720.

More specifically, the action determiner 780 determines whether to display a warning message 950 via the IHU 560 based on the time comparisons from the time comparator 770, as shown in FIG. 9. The warning message 950 includes an acknowledgement button 952 to dismiss the warning message 950. If the safe crossing time $t_{SC}$ is greater than or equal to the train arrival time $t_T$, the action determiner 780 determines that the warning message 950 is to be displayed via the IHU 560. If the safe crossing time $t_{SC}$ is less than the train arrival time $t_T$, the action determiner 780 determines that a warning message is not to be displayed via the IHU 560. For example, the warning message 950 may inform the driver of the vehicle 101 that the train 130 is due to arrive at the at-grade crossing 122 soon.

Figure 10:
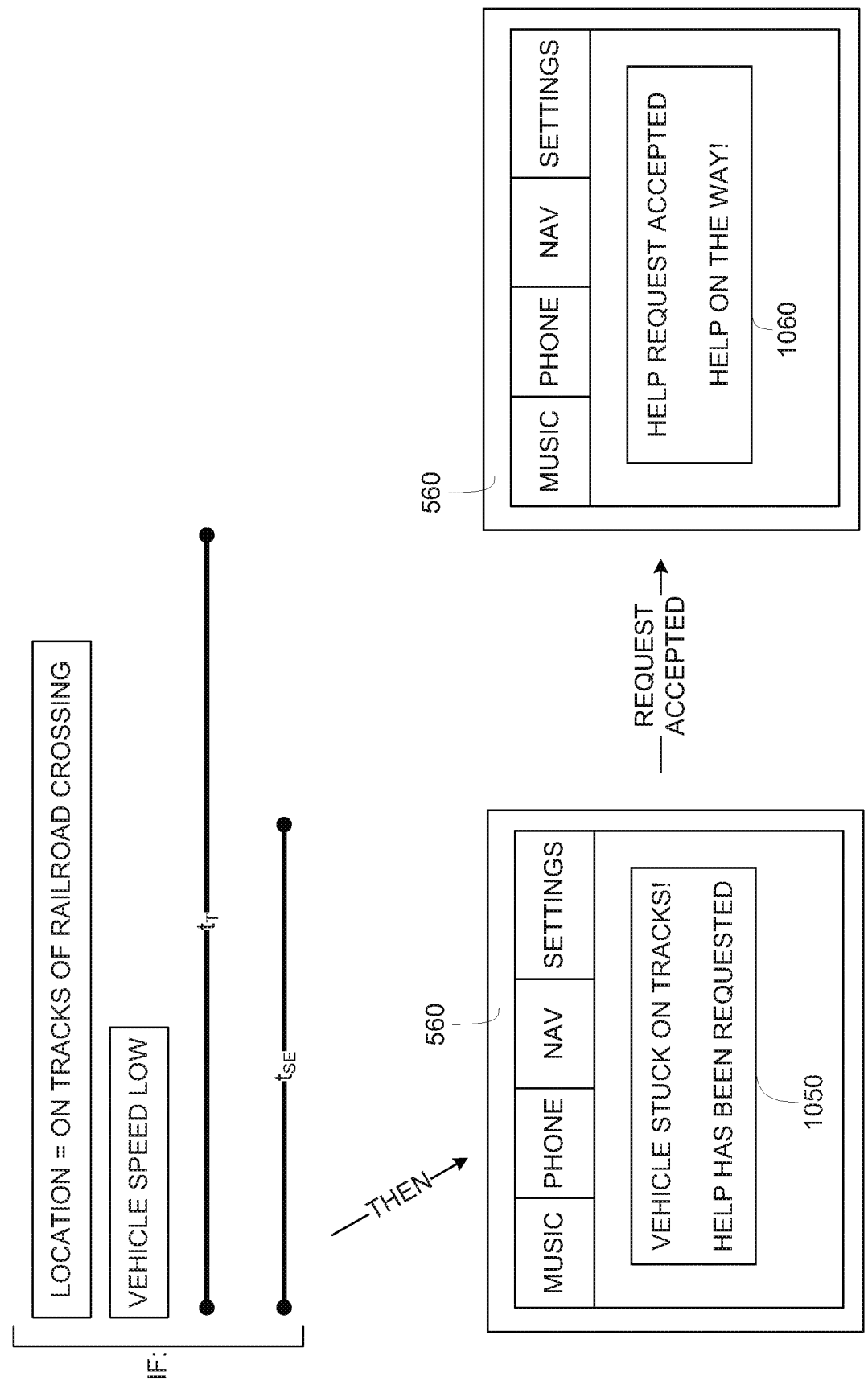
FIG. 10 is a schematic view of logic implemented and another message generated by the electronic components of FIG. 6.

Additionally, the action determiner 780 determines whether to display an emergency message 1050 via the IHU 560 and to send a help request to the neighboring vehicles (e.g., the second vehicle 102), the oncoming train (e.g., the train 130), and to the police (e.g., the police vehicle 104) via the DSRC transceiver 540 and the network 150 based on the time comparisons from the time comparator 770, location data from the GPS receiver 530, and vehicle speed information from the sensors 520, as shown in FIG. 10. For example, the emergency message 1050 may inform a driver of the vehicle 101 that the vehicle 101 is stuck on the tracks of the at-grade crossing.

If the location of the vehicle 101 is on the tracks of the at-grade crossing, the vehicle speed is below the low speed threshold, and the train arrival time $t_T$ is greater than the safe vehicle exit threshold time $t_{SE}$, the action determiner 780 determines that the emergency message 1050 is to be displayed via the IHU 560. If the help request is accepted, the action determiner 780 determines that a help request response status message 1060 is to be displayed via the IHU 560, as shown in FIG. 10. For example, the help request response status message 1060 may inform a driver of the vehicle 101 that the help request was accepted, help will arrive soon, etc.

In response to a help request received from a stranded vehicle, the action determiner 780 determines whether to display a help request message 1150 via the IHU 560 based on the time comparisons from the time comparator 770, as shown in FIG. 11. The help request message 1150 includes a dismiss button 1152 to dismiss the help request message 1150 and an acceptance button 1154 to accept the help request from the stranded vehicle.

If the safe rescue time $t_{SR}$ is greater than or equal to the train arrival time $t_T$, the action determiner 780 determines that a help request message is not to be displayed via the IHU 560. If the safe rescue time $t_{SR}$ is greater than or equal to the police arrival time $t_P$, the action determiner 780 determines that a help request message is not to be displayed via the IHU 560. For example, the help request message 1150 would not be displayed in the second vehicle 102 in a circumstance where the train 130 is due to arrive at the at-grade crossing 122 before the second vehicle 102 could reach and safely rescue the stranded first vehicle 101. As another example, the help request message 1150 would not be displayed in the second vehicle 102 in a circumstance where the police vehicle 104 could reach and safely rescue the stranded first vehicle 101 before the second vehicle 102.

If the safe rescue time $t_{SR}$ is less than the train arrival time $t_T$ and the police arrival time $t_P$ equals or exceeds the train arrival time $t_T$, the action determiner 780 determines that the help request message 1150 is to be displayed via the IHU 560. For example, the help request message 1150 would be displayed in the second vehicle 102 in a circumstance where the train 130 is due to arrive at the at-grade crossing 122 before the police vehicle 104 can rescue the stranded first vehicle 101 but after the second vehicle 102 can reach and safely rescue the stranded first vehicle 101, as shown in FIGS. 3, 4, and 11.

Figure 12:
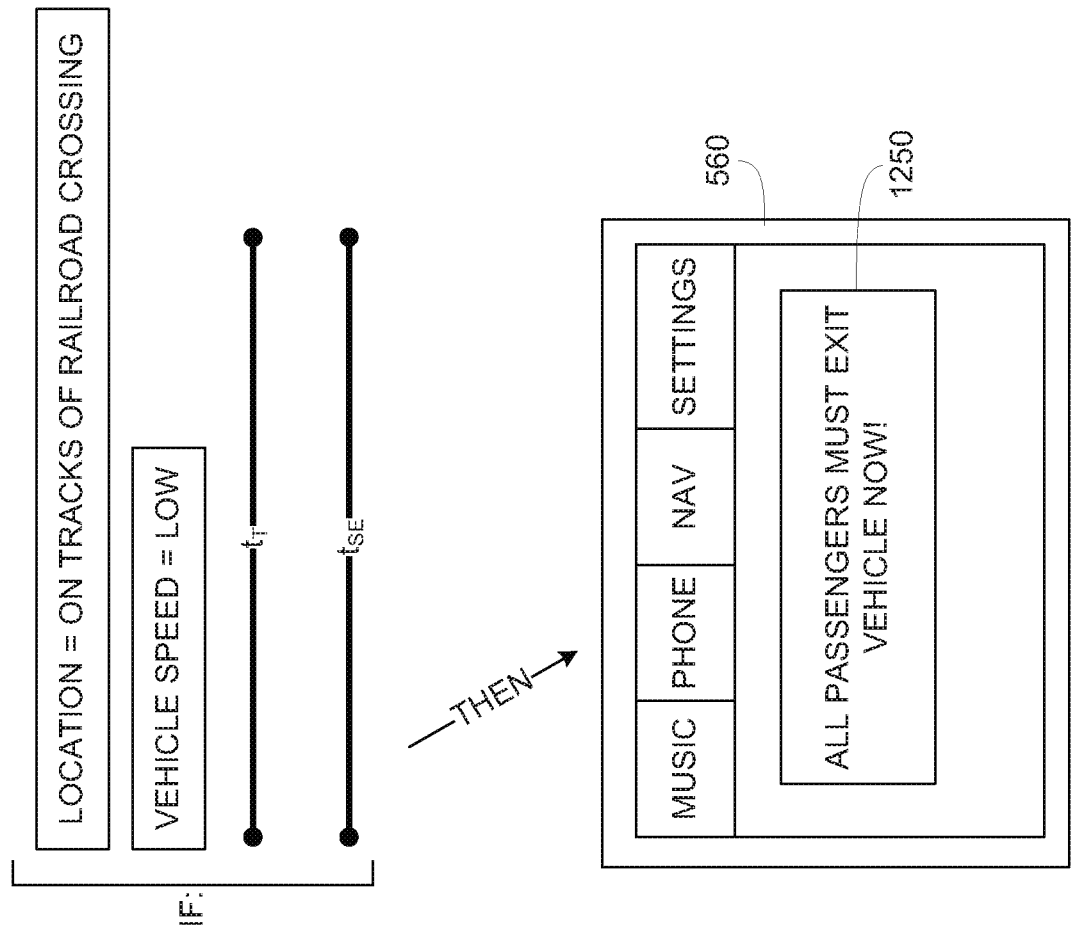
FIG. 12 is a schematic view of logic implemented and another message generated by the electronic components of FIG. 6.

Further, the action determiner 780 determines whether to display an exit message 1250 via the IHU 560 and to send a collision report to the neighboring vehicles (e.g., the second vehicle 102) and to the police (e.g., the police vehicle 104) via the DSRC transceiver 540 and the network 150 based on the time comparisons from the time comparator 770, location data from the GPS receiver 530, and vehicle speed information from the sensors 520, as shown in FIG. 12. If the location of the vehicle 101 is on the tracks of the at-grade crossing, the vehicle speed below the low speed threshold, and the train arrival time $t_T$ is less than or equal to the safe vehicle exit threshold time $t_{SE}$, the action determiner 780 determines that the exit message 1250 is to be displayed via the IHU 560. For example, the exit message 1250 may inform a driver of the vehicle 101 that all passengers must exit the vehicle 101 immediately, remind the driver to retrieve pets in the vehicle 101, remind the driver of the vehicle 101 to unbuckle children in the vehicle 101, etc.

In operation, the feedback generator 790 generates warning messages, alternate route messages, help request messages, emergency messages, exit messages, and help request response status messages for display on the IHU 560. It should be understood that the warning messages, alternate route messages, help request messages, emergency messages, exit messages, and help request response status messages may be accompanied by corresponding audio messages for playback via the IHU 560. When the action determiner 780 determines that an alternate route message is to be displayed, the feedback generator 790 generates the alternate route message 850. When the action determiner 780 determines that a warning message is to be displayed, the feedback generator 790 generates the warning message 950. When the action determiner 780 determines that an emergency message is to be displayed, the feedback generator 790 generates the emergency message 1050. When the action determiner 780 determines that a help request response status message is to be displayed, the feedback generator 790 generates the help request response status message 1060. When the action determiner 780 determines that an exit message is to be displayed, the feedback generator 790 generates the exit message 1250. When the action determiner 780 determines that a help request message is to be displayed, the feedback generator 790 generates the help request message 1150. Additionally, if a driver selects the acceptance button 1154, the feedback generator 790 generates an acceptance response for transmission to the stranded vehicle via the DSRC transceiver 540.

Figure 13:
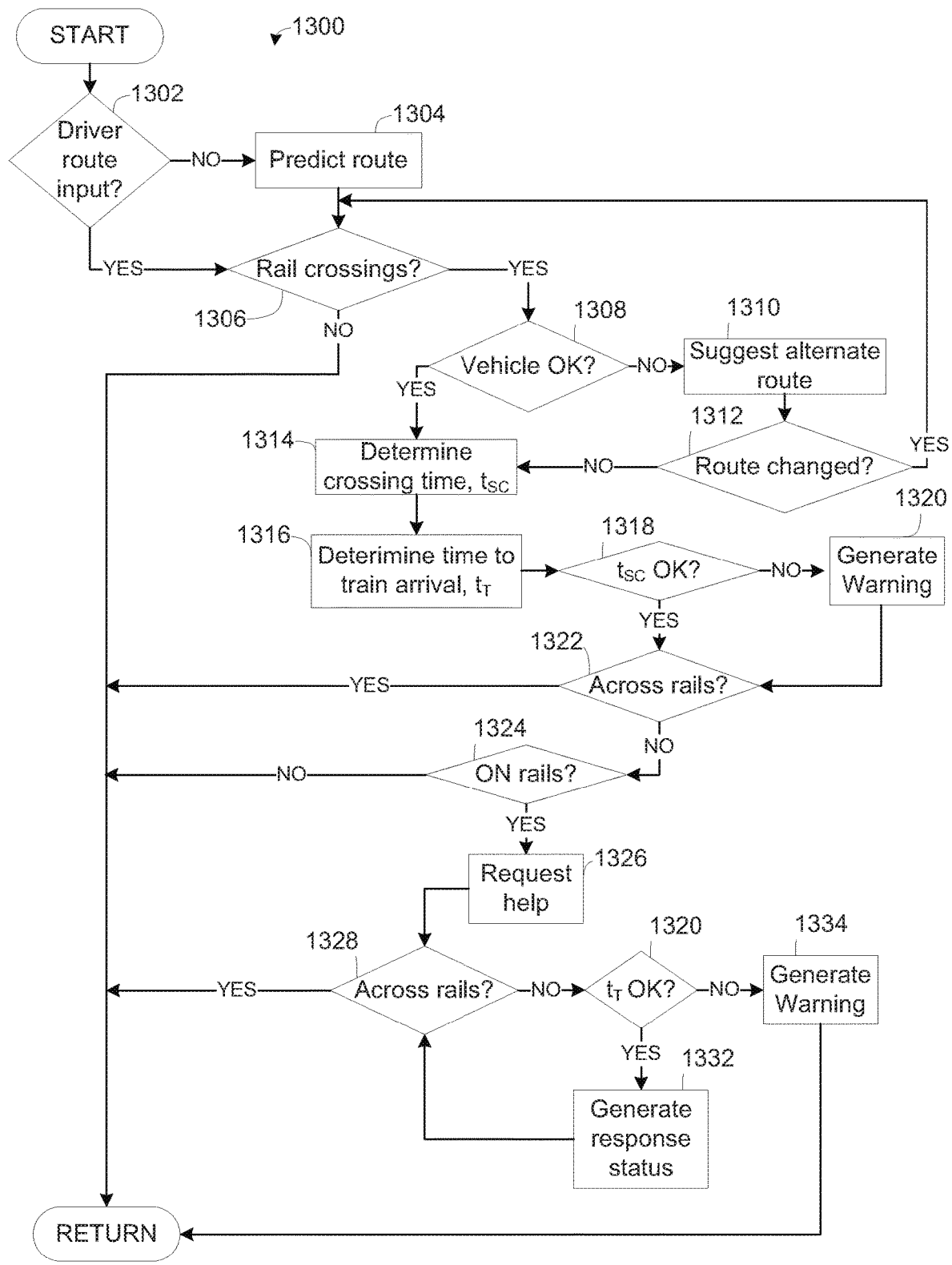
FIG. 13 is a flowchart of a method to analyze railroad crossings along a route of the vehicle of FIG. 1, which may be implemented by the electronic components of FIG. 6.
Figure 14:
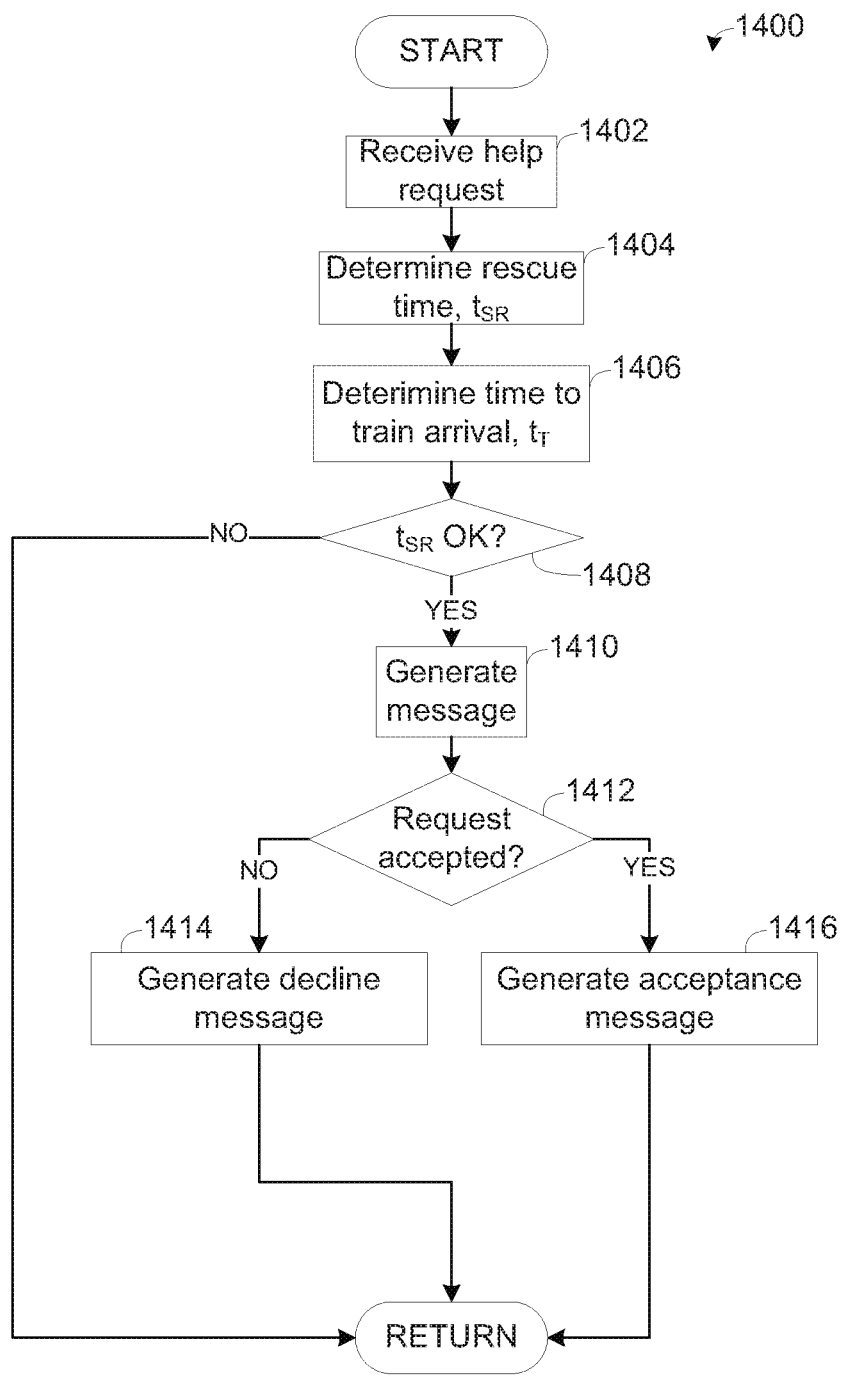
FIG. 14 is a flowchart of a method to analyze railroad crossing help requests, which may be implemented by the electronic components of FIG. 6.

FIG. 13 is a flowchart of a method to analyze railroad crossings along a route of the vehicle of FIG. 1, which may be implemented by the electronic components of FIG. 6. FIG. 14 is a flowchart of a method to analyze railroad crossing help requests, which may be implemented by the electronic components of FIG. 6. The flowcharts of FIGS. 13 and 14 are representative of machine readable instructions stored in memory (such as the memory 620 of FIG. 6) that comprise one or more programs that, when executed by a processor (such as the processor 610 of FIG. 6), cause the vehicle 101 to implement the example crossing analyzer 630 of FIGS. 6 and 7. Further, although the example program(s) is/are described with reference to the flowcharts illustrated in FIGS. 13 and 14, many other methods of implementing the example crossing analyzer 630 may alternatively be used. For example, the order of execution of the blocks may be changed, and/or some of the blocks described may be changed, eliminated, or combined.

Referring to FIG. 13, initially, at block 1302, route determiner 720 determines whether a route has been entered via the IHU 560. As discussed above, a driver of the vehicle 101 may enter a navigation route via the IHU 560. The data receiver 710 forwards the navigation route entry to the route determiner 720.

If, at block 1302, a route was entered, the method 1300 proceeds to block 1306.

If, at block 1302, a route was not entered, the method 1300 proceeds to block 1304.

At block 1304, the route determiner 720 predicts a habitual route of the vehicle 101. The method 1300 then proceeds to block 1306. As discussed above, the route determiner 720 monitors where and when the vehicle 101 travels using location information provided by the GPS receiver 530 via the data receiver 710. The route determiner 720 estimates a habitual route based on accumulated historical location information.

At block 1306, the route determiner 720 determines whether the route of the vehicle 101 includes at-grade railroad crossings. As discussed above, the route determiner 720 accesses the map 622 and/or stored locations of railroad warning equipment 113 and compares locations of at-grade crossings from the map 622 and/or locations of the railroad warning equipment 113 to the entered or habitual route.

If, at block 1306, the route determiner 720 determines that the route does not include at-grade railroad crossings, the method 1300 returns to block 1302.

If, at block 1306, the route determiner 720 determines that the route includes at-grade railroad crossings, the method 1300 proceeds to block 1308.

At block 1308, the vehicle status determiner 730 determines whether the vehicle 101 is in good working order. As discussed above, the vehicle status determiner 730 determines a vehicle operational status based on vehicle information provided by the sensors 520 via the data receiver 710.

If, at block 1308, the vehicle status determiner 730 determines that the vehicle 101 is in good working order (e.g., OK), the method 1300 proceeds to block 1314.

If, at block 1308, the vehicle status determiner 730 determines that the vehicle 101 is not in good working order (e.g., not OK), the method 1300 proceeds to block 1310.

At block 1310, the route determiner 720 determines an alternate route, the action determiner 780 determines that the alternate route message 850 is to be displayed via the IHU 560, and the feedback generator generates the alternate route message 850. As discussed above, the action determiner 780 determines that the alternate route message 850 is to be displayed based on the vehicle operational status from the vehicle status determiner 730 and an available alternate route from the route determiner 720. The method 1300 then proceeds to block 1312.

At block 1312, the route determiner 720 determines whether the alternate route suggestion was taken by a driver to change the route of the vehicle 101. As discussed above, a driver of the vehicle 101 may accept the alternate route suggestion via the acceptance button 852 or may dismiss the alternate route suggestion via the dismiss button 854.

If, at block 1312, the route was changed, the method 1300 returns to block 1302.

If, at block 1312, the route was not changed, the method 1300 proceeds to block 1314.

At block 1314, the crossing time determiner 740 determines a remaining safe crossing time for the vehicle 101. As discussed above, the crossing time determiner 740 determines the remaining safe crossing time $t_{SC}$ based on location information provided by the GPS receiver 530 via the data receiver 710 and the safe crossing time margin $t_{Cm}$.

At block 1316, the train arrival time determiner 750 determines a remaining time until the train 130 arrives at the at-grade crossing. As discussed above, the train arrival time determiner 750 determines the train arrival time $t_T$ based on the train schedule database 162 and location information provided by the GPS receiver 530 via the data receiver 710.

At block 1318, the time comparator 770 determines whether the train arrival time exceeds the safe crossing time.

If, at block 1318, the train arrival time does not exceed the safe crossing time, the method 1300 proceeds to block 1320.

At block 1320, the action determiner 780 determines that a warning message is to be displayed via the IHU 560 and the feedback generator 790 generates the warning message 950. As discussed above, the action determiner 780 determines that the warning message 950 is to be displayed based on the comparison between the safe crossing time $t_{SC}$ and the train arrival time $t_T$ provided by the time comparator 770.

If, at block 1318, the train arrival time exceeds the safe crossing time, the method 1300 proceeds to block 1322.

At block 1322, the action determiner 780 determines whether the vehicle 101 has cleared the at-grade crossing. As discussed above, the action determiner 780 determines whether the vehicle 101 has cleared the at-grade crossing based on location data provided by the GPS receiver 530 via the data receiver 710.

If, at block 1322, the action determiner 780 determines that the vehicle 101 has cleared the at-grade crossing, the method 1300 returns to block 1302.

If, at block 1322, the action determiner 780 determines that the vehicle has not cleared the at-grade crossing, the method 1300 proceeds to block 1324.

At block 1324, the action determiner 780 determines whether the vehicle 101 is stranded on the rails of the at-grade crossing. As discussed above, the action determiner 780 determines whether the vehicle 101 is stranded on the rails of the at-grade crossing 122 based on location data provided by the GPS receiver 530 via the data receiver 710 and a vehicle speed provided by the sensors 520 via the data receiver 710. It should be understood that, while clearing the at-grade crossing 122, the vehicle 101 will be momentarily present on the rails of the at-grade crossing 122. Stranding of the vehicle 101 occurs when the vehicle 101 is present on the rails of the at-grade crossing 122 and is moving slowly or stopped, as shown in FIG. 3.

If, at block 1324, the vehicle 101 is not on the rails, the method returns to block 1302. It should be understood that when the vehicle 101 has not cleared the at-grade crossing and is also not on the rails, the vehicle 101 may be stopped before the at-grade crossing to wait for the train 130 to safely pass, as shown in FIG. 1.

If, at block 1324, the vehicle 101 is on the rails, the method 1300 proceeds to block 1326.

At block 1326, the action determiner 780 determines that an emergency message is to be displayed via the IHU 560 and the feedback generator 790 generates the emergency message 1050. Further, at block 1326, the action determiner 780 sends a help request message to the police, the train 130, and neighboring vehicles via the DSRC transceiver 540 and the network 150. As discussed above, the action determiner 780 determines that the emergency message 1050 is to be displayed and the help request is to be sent based on the comparison between the safe exit time $t_{SE}$ and the train arrival time $t_T$ provided by the time comparator 770, the location information provided by the GPS receiver 530 via the data receiver, the vehicle speed provided by the sensors 520 via the data receiver, and the predetermined low vehicle speed threshold.

At block 1328, the action determiner 780 determines whether the vehicle 101 has cleared the at-grade crossing. Thus, the action determiner 780 follows up on the location of the vehicle 101 while waiting for help from a neighboring vehicle and/or the police vehicle 104 to arrive to push the vehicle 101 off the at-grade crossing 122.

If, at block 1328, the action determiner 780 determines that the vehicle 101 has cleared the at-grade crossing (e.g., has been pushed by a neighboring vehicle or the police vehicle 104), the method 1300 returns to block 1302.

If, at block 1328, the action determiner 780 determines that the vehicle has not cleared the at-grade crossing, the method 1300 proceeds to block 1330.

At block 1330, the time comparator 770 determines whether the train arrival time $t_T$ exceeds the safe vehicle exit time threshold $t_{SE}$.

If, at block 1330, the train arrival time $t_T$ exceeds the safe vehicle exit time threshold $t_{SE}$, the method 1300 proceeds to block 1332.

At block 1332, the action determiner 780 determines that a help request response status message is to be displayed via the IHU and the feedback generator 790 generates the help request response status message 1060. As discussed above, the action determiner 780 determines that the help request response status message 1060 is to be displayed based on a help request reply from a neighboring vehicle and/or the police vehicle 104 and the comparison between the train arrival time $t_T$ and the safe vehicle exit time threshold $t_{SE}$ provided by the time comparator 770.

If, at block 1330, the train arrival time does not exceed the safe vehicle exit time threshold, the method 1300 proceeds to block 1334.

At block 1334, the action determiner 780 determines that an exit message is to be displayed via the IHU and the feedback generator 790 generates the exit message 1250. Further, the action determiner 780 sends a collision report to neighboring vehicles and the police via the DSRC transceiver 540 and the network 150. As discussed above, the action determiner 780 determines that the exit message 1250 is to be displayed an the collision report is to be sent based on the comparison between the train arrival time $t_T$ and the safe vehicle exit time threshold $t_{SE}$ provided by the time comparator 770. Thus, passengers of the stranded vehicle 101 are given the safe vehicle exit threshold time $t_{SE}$ to exit the vehicle 101 before the train 130 arrives at the at-grade crossing 122. The method 1300 then returns to block 1302.

Referring now to FIG. 14, initially, at block 1402, the data receiver 710 (e.g., of the second vehicle 102) receives a help request from a stranded vehicle (e.g., the first vehicle 101) via the DSRC transceiver 540.

At block 1404, the rescue time determiner 760 determines a safe rescue time for the vehicle to reach the stranded vehicle, the vehicle to push the stranded vehicle out of the at-grade crossing, and for the vehicle to clear the at-grade crossing. As discussed above, the rescue time determiner 760 determines the safe rescue time $t_{SR}$ based on location data provided by the GPS receiver 530 via the data receiver 710 and the safe rescue time margin $t_{Rm}$.

At block 1406, the train arrival time determiner 750 determines a remaining time until the train 130 arrives at the at-grade crossing where the stranded vehicle is located. As discussed above, the train arrival time determiner 750 determines the train arrival time $t_T$ based on the train schedule database 162 and location information provided by the GPS receiver 530 via the data receiver 710.

At block 1408, the time comparator 770 determines whether the police arrival time $t_P$ exceeds the train arrival time $t_T$ and whether the train arrival time $t_T$ exceeds the safe rescue time $t_{SR}$.

If, at block 1408, the train arrival time $t_T$ does not exceed the safe rescue time $t_{SR}$, the method 1400 returns to block 1402. Thus, because the vehicle cannot arrive in time to safely help the stranded vehicle, the help request is ignored.

If, at block 1408, the train arrival time $t_T$ exceeds the police arrival time $t_P$, the method 1400 returns to block 1402. Thus, because the police vehicle 104 can arrive to help the stranded vehicle before the train 130 arrives at the at-grade crossing, the help request is ignored.

If, at block 1408, the police arrival time $t_P$ exceeds the trains arrival time $t_T$ and the train arrival time $t_T$ exceeds the safe rescue time $t_{SR}$, the method 1400 proceeds to block 1410.

At block 1410, the action determiner 780 determines that a help request message is to be displayed via the IHU 560 and the feedback generator 790 generates the help request message 1150. As discussed above, the action determiner 780 determines that the help request message is to be displayed based the comparisons between the police arrival time $t_P$, the train arrival time $t_T$, and the safe rescue time $t_{SR}$, provided by the time comparator 770.

At block 1412, the action determiner 780 determines whether the help request was accepted by the driver of the vehicle. As discussed above, a driver of the vehicle may accept the help request via the acceptance button 1154 or may ignore the help request via the dismiss button 1152.

If, at block 1412, the help request was not accepted, the method 1400 proceeds to block 1414.

At block 1414, the feedback generator 790 generates and sends a decline message to the neighboring vehicles and the police via the DSRC transceiver 540 and the network 150. The method 1400 then returns to block 1402.

If, at block 1412, the help request was accepted, the method 1400 proceeds to block 1416.

At block 1416, the feedback generator 790 generates and sends an acceptance message to the neighboring vehicles, the stranded vehicle, and the police via the DSRC transceiver 540 and the network 150. It should be understood that the driver of the rescuing vehicle who accepted the help request may then proceed quickly to the stranded vehicle at the at-grade crossing 122. Upon arriving at the at-grade crossing, the rescuing vehicle may push the stranded vehicle out of the at-grade crossing 122 and clear the at-grade crossing 122 before the train 130 arrives at the at-grade crossing 122. The method 1400 then returns to block 1402.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may help to prevent collisions between trains and vehicles. By warning drivers of routes that include at-grade railroad crossings, drivers may be reminded to avoid stopping directly on the crossing and/or may take an alternate route to avoid at-grade railroad crossings. Additionally, sending help requests to neighboring vehicles may alert drivers of the neighboring vehicles of a stranded vehicle in need of immediate assistance. Thus drivers may quickly help other drivers in situations where a police vehicle cannot arrive before a train arrives at an at-grade crossing. Further, sending help requests may alert train operators to stop or slow a train before the train reaches a blocked at-grade crossing. It should also be appreciated that the disclosed apparatus and methods provide a specific solution—determining whether a vehicle is stranded on a railroad crossing and requesting help to move the stranded vehicle and/or slow an approaching train—to a specific problem—collisions between trains and vehicles at railroad crossings. Further, the disclosed apparatus and methods provide an improvement to computer-related technology by increasing functionality of a processor to determine whether a vehicle is stranded at a railroad crossing, request help from neighboring vehicles, police vehicles, and approaching trains, and to generate messages regarding help request response status and time remaining until a train arrives at a block railroad crossing.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a global positioning system (GPS) receiver to generate location information;
sensors to generate vehicle information;
a transceiver; and
a processor and memory in communication with the transceiver, the sensors, and the GPS receiver and configured to:
determine whether the vehicle is stranded on a railroad crossing using the location information and the vehicle information;
wherein based on determining that the vehicle is stranded, the processor is further configured to:
determine a safe crossing time using the location information and the vehicle information, wherein the safe crossing time comprises a sum of a base crossing time and a crossing time safety margin;
generate a help request based on the safe crossing time; and
transmit the help request to neighboring vehicles.

2. The vehicle of claim 1, further comprising an infotainment head unit (IHU) and wherein the processor is further configured to:
determine a train arrival time using a train schedule accessed via the transceiver;
determine whether the train arrival time exceeds the safe crossing time;
if the train arrival time does not exceed the safe crossing time, generate a warning message; and
display the warning message on the IHU.

3. The vehicle of claim 1, further comprising an infotainment head unit (IHU), wherein:
the help request is a first help request transmitted from the vehicle to the neighboring vehicles; and
based on determining that the vehicle is not stranded, the processor is further configured to:
receive a second help request from one of the neighboring vehicles via the transceiver, the one of the neighboring vehicles being stranded on the railroad crossing;
determine a safe rescue time using the location information and the vehicle information, wherein the safe rescue time comprises a sum of a base crossing time and a rescue time safety margin;
determine a train arrival time using a train schedule accessed via the transceiver;
determine whether the train arrival time exceeds the safe rescue time;
based on determining that the train arrival time exceeds the safe rescue time and a police arrival time exceeds the safe rescue time, generate a help request message; and
display the help request message via the IHU.

4. The vehicle of claim 3, wherein the processor is further configured to:
determine whether the help request message is accepted;
if the help request message is accepted, generate an acceptance message; and
transmit the acceptance message to the one of the neighboring vehicles via the transceiver.

5. The vehicle of claim 1, wherein the processor is further configured to transmit the help request to one or more of a train approaching the railroad crossing or a police vehicle.

6. The vehicle of claim 1, further comprising an infotainment head unit (IHU), wherein the processor is further configured to:
determine a train arrival time using a train schedule accessed via the transceiver; and
determine whether the train arrival time exceeds a safe vehicle exit threshold time;
if the train arrival time does not exceed the safe vehicle exit threshold time, generate an exit message; and
display the exit message on the IHU.

7. The vehicle of claim 6, wherein the processor is further configured to:
if the train arrival time does not exceed the safe vehicle exit threshold time, generate a collision report; and
transmit the collision report to one or more of a police vehicle, the neighboring vehicles, and a train approaching the railroad crossing.

8. The vehicle of claim 1, further comprising an infotainment head unit (IHU), wherein the processor is further configured to:
determine whether a route of the vehicle includes railroad crossings;

if the route includes railroad crossings, generate an alternate route; and
display the alternate route for selection via the IHU.

9. A method comprising:
determining, with a processor, whether a vehicle is stranded on a railroad crossing using location information provided by a global positioning system (GPS) receiver and vehicle information generated by sensors;
wherein based on determining that the vehicle is stranded, the method further comprises:
determining a safe crossing time using the location information and the vehicle information, wherein the safe crossing time comprises a sum of a base crossing time and a crossing time safety margin;
generating, with the processor, a help request based on the safe crossing time; and
transmitting, with the processor, the help request to neighboring vehicles via a transceiver.

10. The method of claim 9, further comprising:
accessing, with the processor, a train schedule via the transceiver;
determining, with the processor, a train arrival time using the train schedule;
determining, with the processor, whether the train arrival time exceeds the safe crossing time;
if the train arrival time does not exceed the safe crossing time, generating a warning message; and
displaying, with the processor, the warning message via an infotainment head unit (IHU).

11. The method of claim 9, wherein the help request is a first help request transmitted from the vehicle to the neighboring vehicles and based on determining that the vehicle is not stranded, the method further comprises:
receiving, with the processor, a second help request from one of the neighboring vehicles via the transceiver, the one of the neighboring vehicles being stranded on the railroad crossing;
determining, with the processor, a safe rescue time using the location information and the vehicle information, wherein the safe rescue time comprises a sum of a base crossing time and a rescue time safety margin;
accessing, with the processor, a train schedule via the transceiver;
determining, with the processor, a train arrival time using the train schedule;
determining, with the processor, whether the train arrival time exceeds the safe rescue time;
based on determining that the train arrival time exceeds the safe rescue time, generating and a police arrival time exceeds the safe rescue time, with the processor, a help request message; and
displaying, with the processor, the help request message via an infotainment head unit (IHU).

12. The method of claim 11, further comprising:
determining, with the processor, whether the help request message is accepted;
if the help request message is accepted, generating, with the processor, an acceptance message; and
transmitting, with the processor, the acceptance message to the one of the neighboring vehicles via the transceiver.

13. The method of claim 9, further comprising:
accessing, with the processor, a train schedule via the transceiver;
determining, with the processor, a train arrival time using the train schedule;
determining, with the processor, whether the train arrival time exceeds a safe vehicle exit threshold time;
if the train arrival time does not exceed the safe vehicle exit threshold time, generating, with the processor, an exit message; and
displaying, with the processor, the exit message via an infotainment head unit (IHU).

14. The method of claim 13, further comprising:
if the train arrival time does not exceed the safe vehicle exit threshold time, generating, with the processor, a collision report; and
transmitting, with the processor, the collision report to one or more of a police vehicle, the neighboring vehicles, and a train approaching the railroad crossing via the transceiver.

15. The method of claim 9, further comprising:
determining, with the processor, whether a route of the vehicle includes railroad crossings;
if the route includes railroad crossings, generating, with the processor, an alternate route; and
displaying, with the processor, the alternate route for selection via an infotainment head unit (IHU).

16. A system comprising:
a central facility having a train schedule database;
a dedicated short range communication (DSRC) transceiver disposed in a vehicle and in communication with one or more of the train schedule database, neighboring vehicles, a police vehicle, and a train;
sensors disposed in the vehicle to generate vehicle information;
a global positioning system (GPS) receiver disposed in the vehicle to generate location information of the vehicle; and
a processor in communication with the DSRC transceiver, the sensors, and the GPS receiver and configured to:
determine whether the vehicle is stranded on an at-grade railroad crossing along a path of the train using the location information and the vehicle information;
wherein based on determining that the vehicle is stranded, the processor is further configured to:
determine a safe crossing time using the location information and the vehicle information, wherein the safe crossing time comprises a sum of a base crossing time and a crossing time safety margin;
generate a help request based on the safe crossing time; and
transmit the help request to neighboring vehicles.

17. The system of claim 16, further comprising an infotainment head unit (IHU) disposed in the vehicle, wherein the processor is further configured to:
receive help request responses from the neighboring vehicles; and
display a help request response status message via the IHU.

18. The system of claim 16, further comprising an infotainment head unit (IHU) disposed in the vehicle, wherein the processor is further configured to:
determine a train arrival time using the train schedule database;
determine whether the train arrival time exceeds a safe vehicle exit time threshold;
if the train arrival time does not exceed the safe vehicle exit time threshold, generate an exit message; and
display the exit message via the IHU.

19. The system of claim 16, further comprising an infotainment head unit (IHU), wherein:

the help request is a first help request transmitted from the vehicle to the neighboring vehicles; and based on determining that the vehicle is not stranded, the processor is configured to:
- receive a second help request from one of the neighboring vehicles, the one of the neighboring vehicles being a stranded vehicle at the at-grade railroad crossing;
- determine a safe rescue time using the location information and the vehicle information, wherein the safe rescue time comprises a sum of a base crossing time and a rescue time safety margin;
- determine a train arrival time using the train schedule database;
- determine whether the train arrival time exceeds the safe rescue time;
- based on determining that the train arrival time exceeds the safe rescue time and a police arrival time exceeds the safe rescue time, generate a help request message; and
- display the help request message via the IHU.

20. The system of claim 19, wherein the processor is further configured to:
- determine whether the help request message is accepted;
- if the help request message is accepted, generate an acceptance message; and
- transmit the acceptance message to the one of the neighboring vehicles via the transceiver.

* * * * *